March 10. 1925.
J. F. MERCER
ELECTRIC HEATER
Filed Nov. 26, 1923
1,529,200
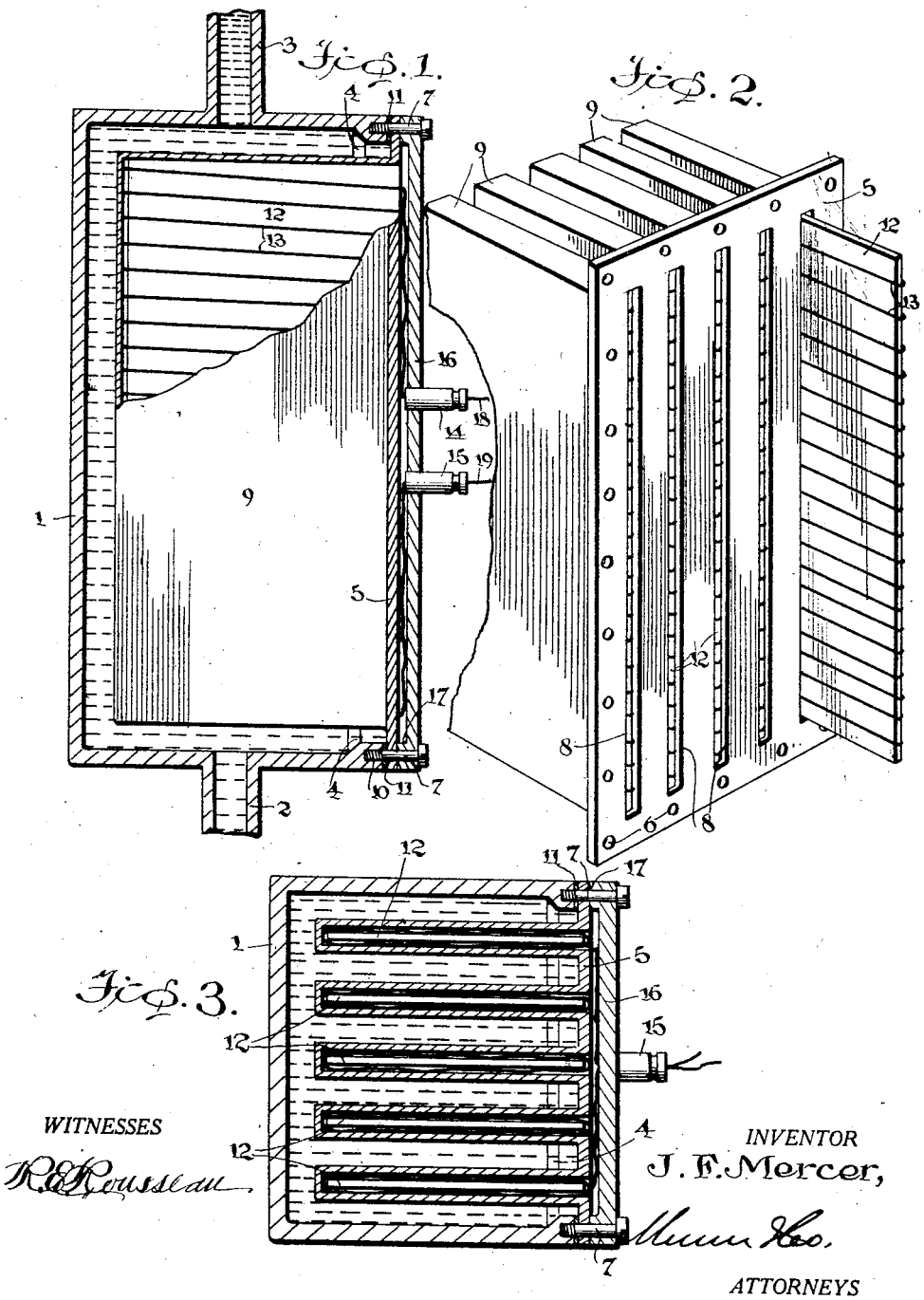
INVENTOR
J. F. Mercer,
ATTORNEYS
WITNESSES Patented Mar. 10, 1925.

1,529,200

UNITED STATES PATENT OFFICE.

JOHN FRANKLIN MERCER, OF GLOBE, ARIZONA.

ELECTRIC HEATER.

Application filed November 26, 1923. Serial No. 677,056.

*To all whom it may concern:*

Be it known that I, JOHN FRANKLIN MERCER, a citizen of the United States, and a resident of Globe, in the county of Gila and State of Arizona, have invented certain new and useful Improvements in Electric Heaters, of which the following is a specification.

This invention relates to electric heaters for liquids and has for its object the provision of a device which is simple and compact in construction and which has an exceedingly high capacity for heating liquids at a low consumption of current.

Another object of the invention is the provision of a device for heating liquids in which the electric heating device forms a closure for an open-ended container through which the liquid is adapted to circulate.

A further object of the invention is the provision of an electric heater for liquids of which the heater forms a closure for an open-ended container through which the liquid circulates, the heater providing a plurality of interstices whereby a great surface of the heater is exposed to the liquid.

Other objects and advantages will become apparent during the course of the following description.

The invention is illustrated by way of example in the accompanying drawings, in which, Figure 1 is a vertical section of a heater constructed according to my invention.

Figure 2 is a view in perspective of the removable electrical heating unit.

Figure 3 is a horizontal section of the heater shown in Figure 1.

Referring to the drawings, 1 designates an open-ended container which is adapted to provide for a circulation of liquid through the same having an inlet pipe 2 and an outlet pipe 3. I have shown the container as rectangular in shape but the same may be of any form desired. Ribs 4 are formed on the inner wall at the top and bottom of the container adjacent the open end for receiving and supporting the opposite ends of an electric heater.

The electric heater comprises a header 5 provided with a plurality of perforations 6 adjacent its periphery to receive bolts 7. The header is provided with a plurality of spaced vertical slots 8. A plurality of casings 9 having their inner ends closed are secured to the rear face of the header and in embracing relation with the slots 8 so that the outer ends of said casings open through the slots 8. The casings 9 are spaced from each other to provide spaces between the same for the circulation of water and as shown more particularly in Figures 1 and 3 the closed ends of the casings are spaced from the rear wall of the container 1.

The upper and lower ends of the casings are seated on the ribs 4 while the inner periphery of the header 5 is seated upon the periphery of the open end of the container 1. A plurality of threaded peforations 10 are formed in the periphery of the open end of the container and aline with the perforation 6 in the header 5 and are adapted to receive the threaded ends of the bolts 7. A rectangular copper gasket 11 is located between the open end of the container 1 and the periphery of the header 5. Mounted within the several casings 9 attached to the header are resistance elements comprising a plate of any suitable material 12 upon which is wound a resistance wire 13. The resistance wires of the intermediate resistance elements are connected together and the ends of the resistance wires of the two outer heating elements are connected to the binding posts 14 and 15 which are mounted in a cap or closure 16. The closure 16 is a flat strip of material having a peripheral rib 17 adapted to be seated upon the portion of the header 5 adjacent its periphery.

The closure 16 is provided adjacent its periphery with a plurality of perforations adapted to register with the perforations 6 in the header 5 so that when the bolts 7 are screwed in their threaded sockets 10 in the open end of the container 1 the header 5, the gasket 11 and the cover plate 16 are securely locked to the open end of the container thereby preventing loss of liquid from said container.

The binding posts 14 and 15 are connected by wires 18 and 19 to a source of current.

It will be noted that the heater including the header and the casings 9 is removable as a unit from the container 1 and that the spacing of the casings 9 from each other provides a great capacity for heating the liquid within the container due to the circulation of the liquid through the interstices between the several casings of the header. It will also be noted that the heating elements 12 are likewise removable from their respective casings 9.

It will be noted that the header and the casings 9 which house the heating elements 12 form a closure for the open end of the container 1 and prevent loss of liquid from said container irrespective of the outer cover plate 16 which is intended more particularly to protect the heating elements from being lost from the containers 9 and from destruction when handling the same.

What I claim is:

1. An electric heater of the class described comprising an open-ended container adapted to hold a liquid, a removable heater comprising a plurality of spaced joined casings closed to the liquid and adapted to be inserted in the open end of the container, electric heating elements in each casing, said removable heater forming a closure for the open end of the container, means for conducting liquid to and away from the container, a cover plate for the outer end of the joined casings, said heating elements being electrically connected and adapted to be connected to a source of current, the heating elements being removably mounted in their respective casings.

2. An electric heater of the class described, an open-ended container adapted to hold a liquid, a removable heater adapted to be inserted within the open end of the container and comprising a header provided with a plurality of elongated slots, casings connected to one face of the header with each casing embracing a slot, an electric heating element in each casing, a gasket located between the open end of the container and the header, and means for securing the gasket and header to the container.

3. An electric heater of the class described, an open-ended container adapted to hold a liquid, a removable heater adapted to be inserted within the open end of the container and comprising a header provided with a plurality of elongated slots, casings connected to one face of the header with each casing embracing a slot, an electric heating element in each casing, a gasket located between the open end of the container and the header, and means for securing the gasket and header to the container, a cover plate adapted to be secured to the outer face of the header, and binding posts on the cover plate connected with the electric heating elements in the casings.

JOHN FRANKLIN MERCER.